US006938242B2

(12) United States Patent
Limousin et al.

(10) Patent No.: US 6,938,242 B2
(45) Date of Patent: Aug. 30, 2005

(54) EQUIPMENT INSTALLATION PLANNING METHOD AND APPARATUS

(75) Inventors: Marie-Laure Limousin, Brookline, MA (US); Michael Olson, Wales, WI (US); Mary Ramuta, North Prairie, WI (US); Amy Lazarus, Menomonee Falls, WI (US); Jon Stoa, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 09/792,831

(22) Filed: Feb. 23, 2001

(65) Prior Publication Data

US 2002/0169651 A1 Nov. 14, 2002

(51) Int. Cl.[7] .................................................. G06F 9/44
(52) U.S. Cl. ...................... 717/121; 715/751; 715/764; 717/103; 717/105
(58) Field of Search ................................. 717/101–105, 717/120–123; 715/764–765; 345/764–765; 707/2–5, 100–101

(56) References Cited

U.S. PATENT DOCUMENTS

| 6,023,702 A | * | 2/2000 | Leisten et al. ............... 707/100 |
| 6,311,190 B1 | * | 10/2001 | Bayer et al. ............. 707/104.1 |
| 6,473,762 B1 | * | 10/2002 | Knoblock et al. .......... 707/100 |
| 2001/0042032 A1 | * | 11/2001 | Crawshaw et al. |
| 2002/0082898 A1 | * | 6/2002 | Panelli ........................ 705/10 |

OTHER PUBLICATIONS

Microsoft Computer Dictionary, Fifth Edition, 2002, p. 413.*

* cited by examiner

Primary Examiner—Chameli C. Das
Assistant Examiner—Lawrence Shrader
(74) Attorney, Agent, or Firm—Fletcher Yoder (57) ABSTRACT

A system and method for managing the installation of equipment, machines or systems. The system comprises tools that are operable to develop and manage an installation plan. The installation plan provides a timetable for the performance of installation tasks. The installation plan may be developed and managed using an information system that is accessible via a network or using a portable remote unit. The method comprises using the tools to develop and manage the installation plan.

35 Claims, 12 Drawing Sheets

INSTALLATION PLANNING TOOL

1. WHAT IS YOUR POLE OR COUNTRY?  [USA ▼] [CT ▼]
2. WHAT IS THE EQUIPMENT YOU WANT TO KNOW ABOUT?
3. ARE YOU REPLACING PREVIOUS EQUIPMENT (SWAP), UPGRADING ONE, OR INSTALLING AN ADDITIONAL ONE?  ○REPLACEMENT  ○UPGRADE  ○NEW INSTALLATION
4. IS THE ROOM ALREADY BUILT AND COMPLETED TO SPECIFICATIONS?  ○YES ○NO
5. HAS THE PERMIT/STATE APPROVAL BEEN RECEIVED?  ○YES ○NO
6. DID YOU ALREADY SELECT AN ARCHITECT?  ○YES ○NO
7. DID YOU ALREADY SELECT A CONTRACTOR?  ○YES ○NO — 214
8. WHAT IS THE DATE WHEN YOU WOULD LIKE THE EQUIPMENT IN USE?  *[D-MMM-YYY OR M/D/YYYY]
   OR, YOU MAY INSTEAD SPECIFY A PROJECT START DATE: — 216  *[LIKE 1-JAN-2001 OR 1/1/2001]
   [NOTE THAT THE IN USE DATE ALWAYS TAKES PRECEDENCE.]

212

ROOM NAME: [        ] — 218          SITE NAME: [CUSTOMER X] — 220
CONTACT PERSON: [JOHN DOE] — 224     TELEPHONE: [262 548 5106] — 226
EMAIL ADDRESS: [johndoe@supplier.com] — 228
         222
COMMENTS: [                    ]                   [UNDO CHANGES]

[VALIDATE DATES] — 230

1) SELECT THE POLE OR COUNTRY
   [USA ▼]

2) SELECT THE MODALITY
   [VASCULAR ▼]

3) WHAT TYPE OF INSTALLATION IS THIS?
   246    ○ REPLACEMENT
          ○ UPGRADE
          ⊙ NEW INSTALLATION

4) IS THIS ROOM ALREADY BUILT AND COMPLETED TO SPECIFICATIONS?
                                                    ○ YES  ⊙ NO

5) HAS THE PERMIT/STATE APPROVAL BEEN RECEIVED?
                                                    ○ YES  ⊙ NO

6) HAS A ARCHITECT ALREADY BEEN SELECTED?
                                                    ○ YES  ⊙ NO

7) HAS A CONTRACTOR ALREADY BEEN SELECTED?
                                                    ○ YES  ⊙ NO

8) ENTER THE QUOTE NUMBER OR ORDER THIS PLAN WILL BE FOR
   [         ]—252      [     ] [     ] [I]

9) ENTER THE CRD FIRST USE DATE REQUESTED OR A PLAN START DATE
   CRD: [         ]—248  START DATE: [         ]
                                                        250
10) ENTER THE CUSTOMER INFORMATION FOR THIS PLAN
254  SITE NAME: [         ]  (FACILITY/CUSTOMER NAME)
         NAME:  [         ]  (PERSON PROVIDING CRD DATE)
     TELEPHONE: [         ]  (CONTACT INFORMATION FOR ABOVE)
     E-MAIL ADDR: [         ] (ELECTRONIC MAIL ADDRESS)

256 —[ OK ]       [ CANCEL ]— 258

| ORDER INFORMATION | CONTACTS | EQUIPMENT LIST | ORDER MILESTONES | SITE PREP PLAN |
|---|---|---|---|---|

ORDER INFORMATION

| | |
|---|---|
| SUPPLIER ORDER NO | 11111 |
| PURCHASE ORDER NO | XXXXX |
| MODALITY | MR |
| CREATION DATE | ______ |
| SCHEDULED ARRIVAL DATE | ______ |
| PROMISED DATE | ______ |

FIG. 12

| ORDER INFORMATION | CONTACTS | EQUIPMENT LIST | ORDER MILESTONES | SITE PREP PLAN |
|---|---|---|---|---|

CONTACTS

| | |
|---|---|
| INSTALLATIOR SPECIALIST | ______ |
| SALES REPRESENTATIVE | ______ |

FIG. 13

| ORDER INFORMATION | CONTACTS | EQUIPMENT LIST | ORDER MILESTONES | SITE PREP PLAN |
|---|---|---|---|---|

EQUIPMENT LIST

| QTY | CATALOG # | DESCRIPTION |
|---|---|---|
| ___ | ___ | ___ |
| ___ | ___ | ___ |
| ___ | ___ | ___ |

EQUIPMENT INSTALLATION PLANNING METHOD AND APPARATUS

FIELD OF THE INVENTION

The present invention relates generally to a system and method for planning the installation of equipment and, more particularly, to a system and method for planning the installation of a medical system at a customer's facility.

BACKGROUND OF THE INVENTION

Today, many businesses operate machines or systems. These machines or systems may be very large and very complex. Extensive preparations may be required before a machine or system may be placed into service. For example, a suitable structure may need to be constructed, or modifications made to an existing structure, to house portions of a equipment. Thus, contractors and architects may be needed, as well as building permits. Additionally, machines or systems may require resources, such as electricity, gases, fuel, etc., that must be routed to the device and/or system. Additionally, operation of the device or system may be dangerous, thus requiring protective measures to be taken to prevent harm to employees and the public. Furthermore, extensive training may be required before the device and/or system may be operated. Therefore, a high lever of planning and coordination may be needed to place the device or system in service in a timely manner or by a desired date.

Medical diagnostic systems are examples of machines or systems that may require extensive preparation before being placed into service. Examples of medical diagnostic systems include: X-ray machines, magnetic resonance imaging (MRI) systems, computed tomography (CT) systems, ultrasound systems, positron emission tomography (PET) systems, and nuclear medicine systems. The requirements for placing these devices into operation may be extensive.

From experience, a medical diagnostic system supplier may develop a large body of knowledge as to the steps needed to install the system components and how long they should take to complete. However, each installation is different. For example, the contractors, the building sites to house the systems, and the building codes all may vary from installation to installation. Consequently, steps of the installation process may be completed ahead of or behind schedule. Thus making coordination of the installation process difficult. Additionally, it may be difficult for the supplier and the customer to inform each other of changes that need to be made to the installation plan.

There is a need, therefore, for an improved technique for managing the installation of a machine, device, or system. There is a particular need for a system or method that provides a customer and a supplier with the tools to develop and manage an installation plan for a machine, device, or system, such as a medical diagnostic system.

SUMMARY OF THE INVENTION

According to one aspect of the present invention, a system is featured to provide a customer with information for installing a device or system in a customer's facility. The system comprises a first application to provide a query page. The query page contains a plurality of questions and answer choices to elicit information regarding the installation of a particular device or system. At least one of the questions and answers is used to elicit a desired milestone date associated with the installation of the device or system. The system also utilizes a database. The database contains a plurality of tasks to be performed to install the device. The database also contains a model timetable for performing each of the plurality of tasks. The system also comprises a second application. The second application utilizes the model timetable to develop a specific timetable for installation of the particular device based on the milestone date. The system also enables the specific timetable to be modified to reflect deviations from a model installation.

According to another aspect of the present invention, a system is featured to develop and manage the installation of medical system. The system comprises a model installation plan stored in memory. The model installation plan comprises a plurality of tasks to be completed to install a model medical system and an expected timetable for performance of each of the plurality of tasks. A data gathering portion of the system is used to elicit installation information for installing a specific medical system. The system also comprises a tool stored in memory. The tool is operable to establish specific tasks and a specific timetable for performing the specific tasks for installing the specific medical system based on the installation information elicited by the data gathering portion.

According to another aspect of the present invention, a method is featured for managing the installation of a medical system. The method comprising the act of developing a list of tasks to be performed to install a medical system. The method also comprises the act of eliciting installation information from a customer. The method also comprises establishing a plan of tasks to be performed based on the list of tasks to be performed and the installation information elicited from the customer. The method also comprises the acts of providing the plan of tasks to be performed for viewing by a customer via a network and enabling the plan of tasks to be performed to be modified to reflect actual installation conditions.

BRIEF DESCRIPTION OF THE DRAWINGS

The foregoing and other advantages of the invention will become apparent upon reading the following detailed description with reference to the drawings in which.

DETAILED DESCRIPTION OF THE INVENTION

In the discussion that follows, a system and method for assisting a customer to manage the installation of a medical system, such as a medical imaging system, is described. However, the present invention is not limited to assisting customer's install medical systems, or medical imaging systems.

Figure 1:
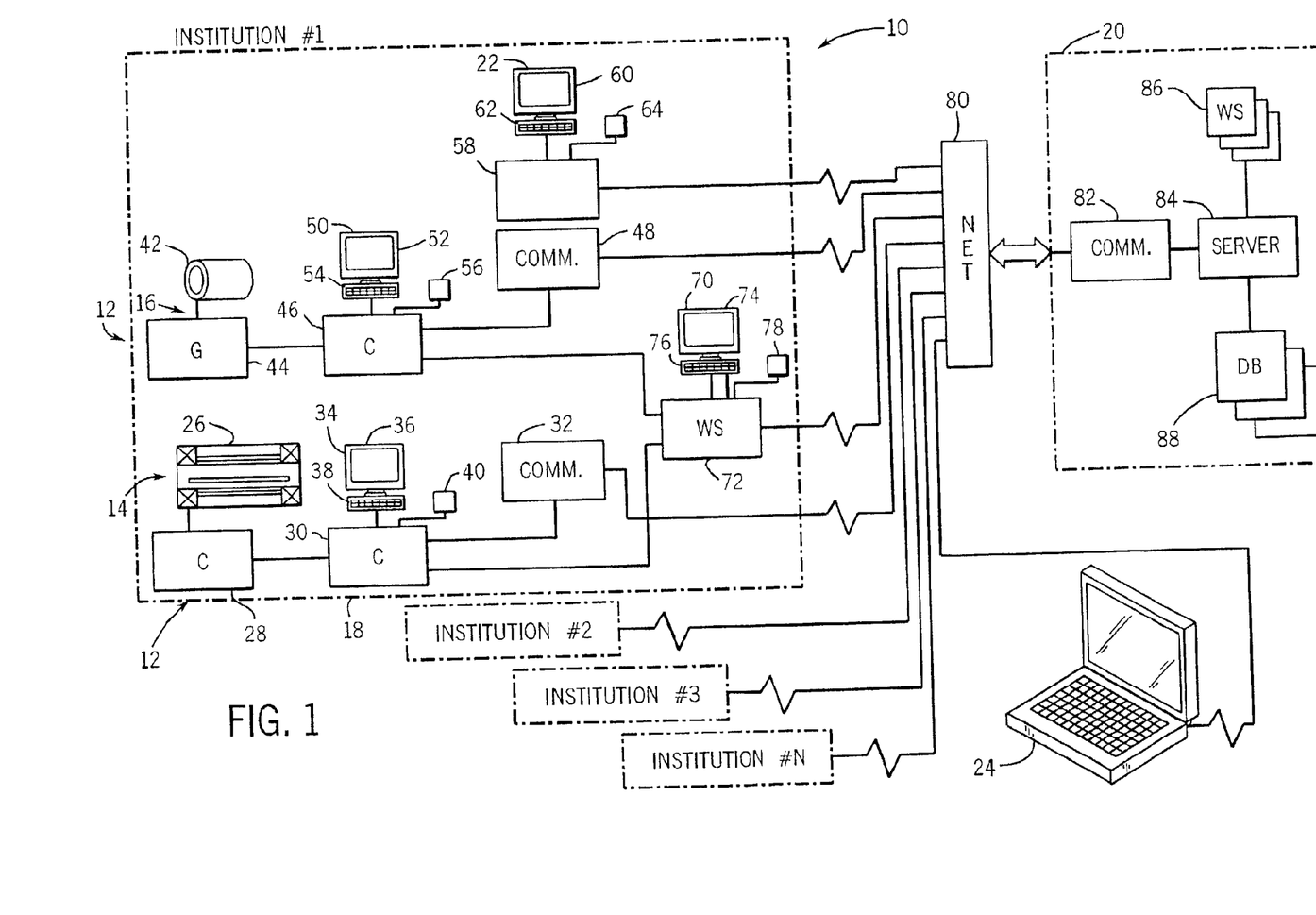
FIG. 1 is a diagram illustrating an exemplary system for communication and data exchange between a plurality of medical diagnostic system customers and an information system provided by a medical system supplier.

Turning now to the drawings, and referring first to FIG. 1, a communication system 10 is illustrated that enables a medical equipment supplier to communicate with medical equipment customers and provide them with equipment installation information and installation planning tools. An equipment supplier may use communication system 10 to communicate with a plurality of customers, represented by institutions #1, #2, #3 through #N. A medical equipment customer may seek to obtain new, or improved, medical equipment, such as imaging systems, clinical diagnostic systems, physiological monitoring systems, and so forth.

Each of these types of medical equipment may vary greatly in size and complexity. For example, medical imaging systems are produced in a number of different modalities, such as magnetic resonance imaging (MRI) systems, computed tomography systems, ultrasound systems, positron emission tomography (PET) systems, and nuclear medicine systems. In this embodiment, the customer possesses a MRI system 14 and a CT system 16 in a medical facility 18. The customer may seek to replace an existing imaging system, to obtain additional MRI or CT systems, other imaging systems, a clinical diagnostic system or a physiological monitoring system. Extensive preparations and facility modifications may be required before the medical equipment may be used to examine patients.

In this embodiment, a medical system customer may gain remote access to an information system 20 via the communication system 10 to develop and manage a preparation plan for installing a medical system. The information system 20 is accessible by a customer using a customer unit 22 and to a representative of the supplier, such as installation specialist, using a remote unit 24. Client workstations used with the imaging systems also may have access to the information system 20. The information system 20 may enable customers to develop and manage a preparation plan for each modality of imaging system provided by the supplier.

The medical facilities, as noted above, may utilize a variety of medical systems. Depending upon the modality of the systems, various subcomponents or subsystems may be required for operation. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. The system controller 30 includes a uniform platform for interactively exchanging client data and processing requests with information system 20, as described more fully below. The system controller 30 is linked to a communications module 32, which may be included in a single or separate physical package from system controller 30. System controller 30 is also linked to an operator station 34, which will typically include a computer monitor 36, a keyboard 38, as well as other input devices 40, such as a mouse. In a typical system, additional components may be included in system 14, such as a printer or photographic system for producing reconstructed images based upon data collected from scanner 14. Although reference is made herein generally to "scanners" in diagnostic systems, that term should be understood to include medical diagnostic data acquisition equipment generally.

Similarly, CT system 16 will typically include a scanner 42, which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for processing at the information system 20. Also, the system controller 46 is coupled to an operator station 50, which includes a computer monitor 52, a keyboard 54, as well as other input devices 56, such as a mouse. Moreover, like MRI system 14, CT system 16 will generally include a printer or similar device for outputting reconstructed images based upon data collected by scanner 42. Other modality devices will include circuitry and hardware particularly configured for acquiring or producing signals in accordance with their particular design.

Customer unit 22 includes a workstation or personal computer 58, a monitor 60, as well as input devices such as a keyboard 62 and mouse 64. Additionally where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated embodiment. The management system may include a computer workstation or personal computer 72 coupled to the system controllers in an Intranet configuration, in a file sharing configuration, a client/server arrangement, or in any other suitable manner. Moreover, management station 70 will typically include a monitor 74 for viewing system operational parameters, analyzing system utilization, and exchanging client data and processing information between the facility 20 and the information system 20. Input devices, such as a standard computer keyboard 76 and mouse 78, may also be provided to facilitate the user interface. It should be noted that, alternatively, the management system, or other diagnostic system components, may be "stand-alone" or not coupled directly to the information system 20.

The communication modules mentioned above, as well as workstation 72 and remote client unit 24, may be linked to information system 20 via a remote access network 80. For this purpose, any suitable network connection may be employed. Presently preferred network configurations include both proprietary or dedicated networks, as well as open networks, such as the Internet. Data may be exchanged between the institutions, medical resources, client computers and the remote information system 20 in any suitable format, such as in accordance with the Internet Protocol (IP), the Transmission Control Protocol (TCP), or other known protocols. Moreover, certain portions of the data may be transmitted or formatted via markup languages such as the HyperText Markup Language (HTML), Extensible Markup Language (XML), or other Internet and communication languages. Exemplary interface structures and communications components are described in detail below.

Within the information system 20, messages, customer and supplier data is communicated via communication components as indicated generally at reference numeral 82. The communication components 82 direct the customer data to a server, or a processing system 84, for receipt, handling and processing. In general, processing system 84 may include one or a plurality of computers, as well as dedicated hardware or software servers for processing the various requests and for receiving and transmitting the information as described more fully below. The information system 20 also may include a bank of workstations 86, which may be staffed by project managers or sales representatives who address the processing requests and provide off and online assistance in response to the processing requests. Also, the processing system 84 may be linked to a set of databases or other processing systems 88 at or remote from the information system 20. The databases and processing systems may be used for diagnostic analysis of the images captured by the diagnostic equipment 12.

The databases and processing systems also may include extensive information and tools to assist a customer to prepare a medical facility to receive a medical imaging system 12, or other medical equipment. The information may include a list of tasks to be performed and a timetable for completing the tasks. This information in the databases may be supplemented by information provided by a client, using a client remote unit 22, or an installation specialist employed by the equipment supplier to oversee the installation of a medical diagnostic system. The number of tasks to be completed to install a medical system may be extensive and the responsibility for completing the tasks may be shared by multiple parties, such as the customer, the supplier, contractors, and architects. For example, to install an MRI system may require that permits and State approvals be obtained and that credit for the purchase of the system be obtained. Additionally, the customer may need to select an architect to design the facility to house the MRI system and then the customer may need to review and approve preliminary drawings provided by the architect and/or the supplier. Construction bid requests may need to be prepared, bids evaluated, contractors selected, and purchase orders issued. With an MRI system, a magnetic shield and an RF shield must be in place, therefore, magnetic and RF shielding calculations may be required and magnetic and RF shields installed. Room preparations may be required before the magnets and other equipment are delivered. The equipment itself must be ordered, shipped, and installed at the customer's facility. The system must be powered up and calibrated before the first patient may use the MRI system. Finally, there may be a formal procedural transfer of the MRI system from the supplier to the customer.

Information system 20 includes tools that allow customers to develop a facility preparation plan and manage the installation of medical equipment. The tools enable customers to go online with the supplier to access specific information about their projected or outstanding orders. Supplier employees, such as sales representatives, installation specialists, and product managers, work with an offline version of the tools to develop and manage a facility preparation plan for the customer. The supplier employees may then synchronize the data in the online version with the data in the offline data. In an exemplary embodiment, the information system stores the tasks to be performed to install each medical system. The tools use historical data to determine the standard duration for performing each of the tasks and use this information to develop a facility preparation plan. The tools enable the customer to generate a realistic plan based on different milestones, such as the customer's desired first use date or the desired start date. Preferably, it does not matter whether a facility preparation plan is initially developed in the online or offline version, the same form appears to a customer reviewing the plan online. The tools also enable the customer and supplier to manage the installation of the medical equipment and modify the preparation plan as changes occur. For example, the customer or the supplier may learn that a contractor will not complete a first task by the date specified in the facility preparation plan for completion. The start date of other tasks that are dependent on completion of the first task may need to be revised to a later date to reflect the delay. Alternatively, if a first task is to be completed ahead of schedule, the start date of tasks dependent on completion of the first task may be moved up.

Figure 2:
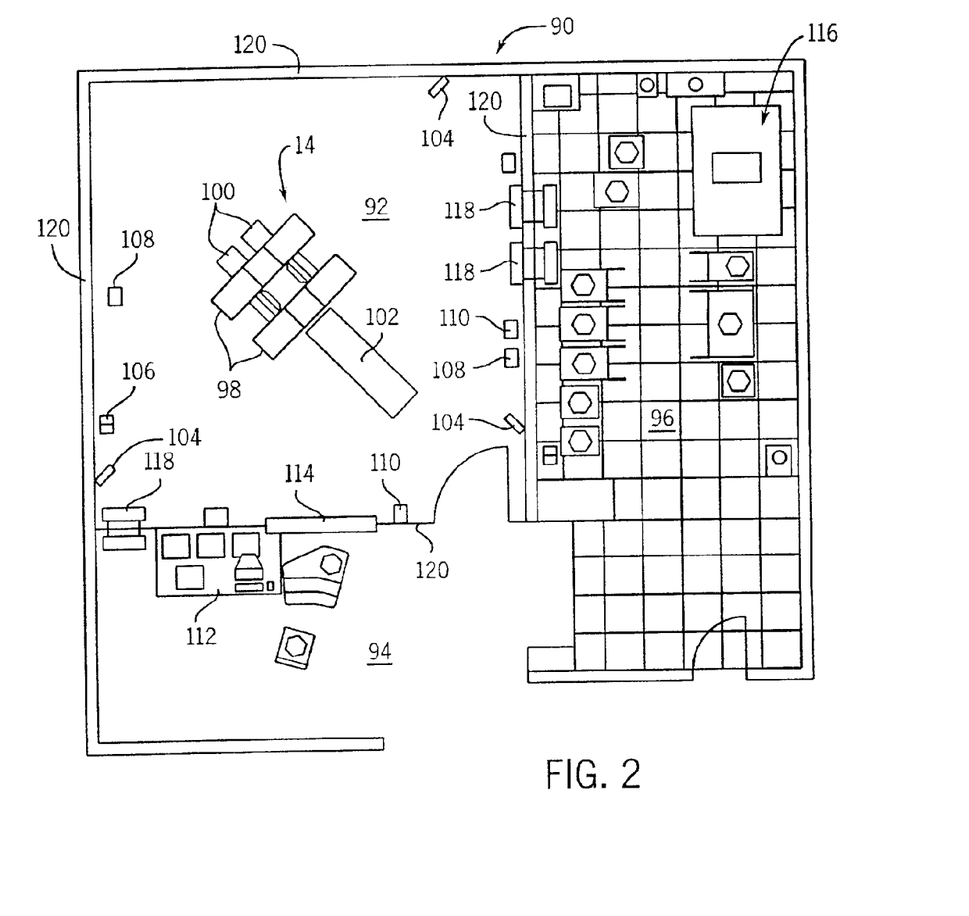
FIG. 2 is a diagram of a facility configured to house a medical system and its supporting equipment.

Medical equipment may require elaborate facilities tailored to the operation of the medical equipment. Referring generally to FIG. 2, a portion 90 of a medical facility is featured to illustrate tasks that may need to be performed to prepare a medical facility for operation of a medical imaging system. In the illustrated embodiment, the portion of the medical facility is used to house and operate an MRI system 14. The main portion of the MRI system 14 is housed in a procedure room 92. An operator stationed in a control room 94 adjacent to the procedure room 92 operates the MRI system 14. In this embodiment, surgical procedures using MRI system 14 may be performed in the procedure room 92. The supporting equipment needed to operate MRI system 14 is housed within an equipment room 96.

The medical facility must be prepared to support the weight of the MRI system 14. MRI system 14 utilizes large and heavy electromagnets 98, cooled by cryocoolers 100, to produce a magnetic field. During the procedure, patients are placed on a moveable platform 102 and exposed to the magnetic field. Additionally, cameras 104 may be placed around procedure room 92 to enable the operator, or other viewers, to view the patient during the MRI procedure. Other items that may be utilized as part of the MRI system 14 are an intercom 106 and speakers 108 to enable the operator to communicate with the patient. Emergency buttons 110 may also be placed at several locations around procedure room 92 to enable power to immediately be secured to the MRI system 14 during an emergency.

In the illustrated embodiment, an operator controls the operation of MRI system 14 from a control panel 112 located in the control room 94. Control panel 112 may include a system controller and an operator station 34. In addition to cameras 104, the operator may observe a patient through a window 114 between procedure room 92 and control room 94. Various equipment 116 may be placed in equipment room 96 to support the operation of MRI system 14. Additionally, electrical wiring and/or gases may be required to be routed into procedure room 92 through passages 118 in walls 120 of procedure room 92. Additionally, there may be detailed requirements regarding the facilities and the equipments specifications. For example, the floor of the procedure room may have defined requirements for flatness and levelness beneath the MRI system. The MRI system 14 and other pieces of equipment may need to be tested prior to use. Thus, there may be many significant tasks besides simply assembling the MRI system 14 in the facility that must be performed before the first patient may use the MRI system 14.

Figure 3:
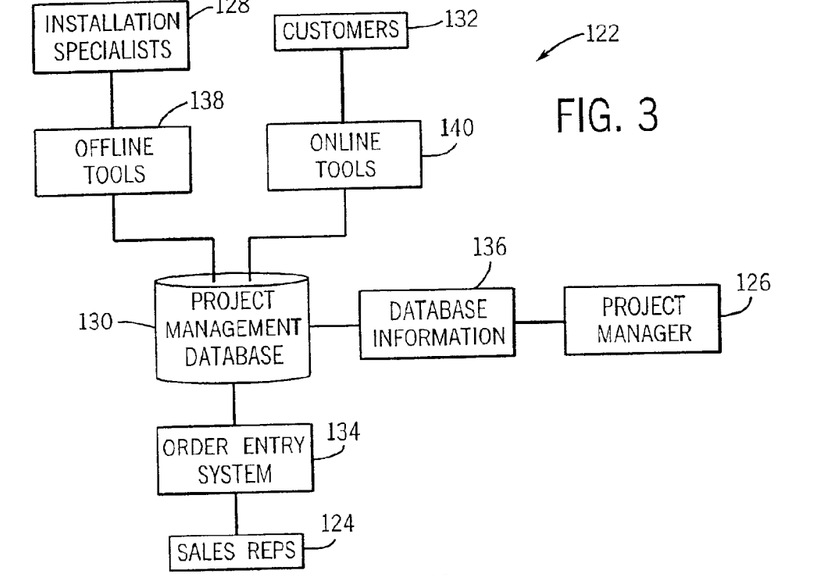
FIG. 3 is a block diagram of an exemplary embodiment of an information system to provide a customer with a preparation plan for installing a medical system in the customer's facility.

Referring generally to FIG. 3, a system 122 to provide a customer with a preparation plan for installing a medical system in the customer's facility is illustrated. System 122 may utilize information system 20, customer unit 22, supplier remote unit 24, and network 80. In the illustrated embodiment, the medical system supplier employs sales representatives 124, project managers 126, and installation specialists 128 to provide customers 132 with medical systems and the knowledge to enable a customer to install the medical system. The system 122 utilizes a project management database 130 within information system 20 to store information. The project management database 130 may be provided with information from sales representatives 124, project managers 126, installation specialists 128, and customers 132. The project management database 130 may written in a standard database language, such as Oracle. The sales representatives 124 may interface with the project management database via an order information system 134 and the project managers 126 may interface with the project management database 130 via a database information system 136.

An installation specialist may visit the customer or otherwise gather information regarding the installation of the medical system at the customer's facility. The installation specialist 128 may utilize an offline tool 138 operated on a supplier remote unit 24 to develop a preparation plan for installing a medical system in the customer's facility. The offline tool may be a software application written in a programming language, such as visual basic, and executed by a processor. The supplier remote unit 24 also may be used to periodically interface with the project management database 130 to transfer information to and from the project management database. The customers 132 may utilize an online tool provided by the information system 20 to interface with the project management database 130 and to develop a preparation plan for installing a medical system in the customer's facility. The online tool may be a software application stored on the information system 20 and written in a programming language, such as Java.

Figure 4:
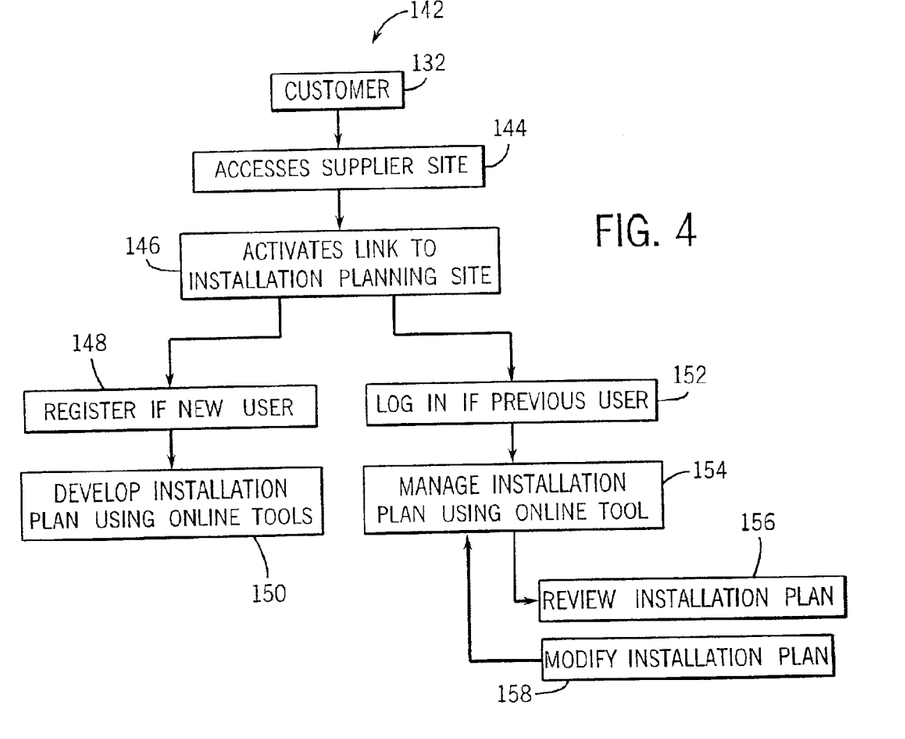
FIG. 4 is a block diagram of an exemplary embodiment of a process to enable a customer to use an information system to develop and manage a preparation plan for installing a medical system.

Referring generally to FIG. 4, a process 142 whereby a customer 132 may use system 122 to develop and manage a plan for installing a medical system is illustrated. In the illustrated embodiment, the customer uses a customer unit 22 to access a supplier site provided by information system 20 and accessible via network 80, as referenced by step 144. At the supplier site, the customer activates a link to an installation planning site, as referenced by step 146. Preferably, the information system 20 has security measures to prevent unauthorized access to customer information. Therefore, if the customer is a new user, the customer may be required to register to use the installation planning site, as referenced by step 148. Once registered, the customer develop an installation plan for installing the medical system using online tools provided by information system 20 through the installation planning site, as referenced by step 150. The installation plan provides the customer with information to install the medical system, such as the tasks to be performed and a timetable for performance of the tasks. Once a customer is registered to use the installation planning site, the customer may periodically log in to use the online tools, as reference by step 152. The customer uses the online tools to manage the installation plan, as referenced by step 154. For example, a customer may review the installation plan, as referenced by step 156, or a customer may modify the existing installation plan as the tasks are completed or as events unfold, as referenced by step 158.

Figure 5:
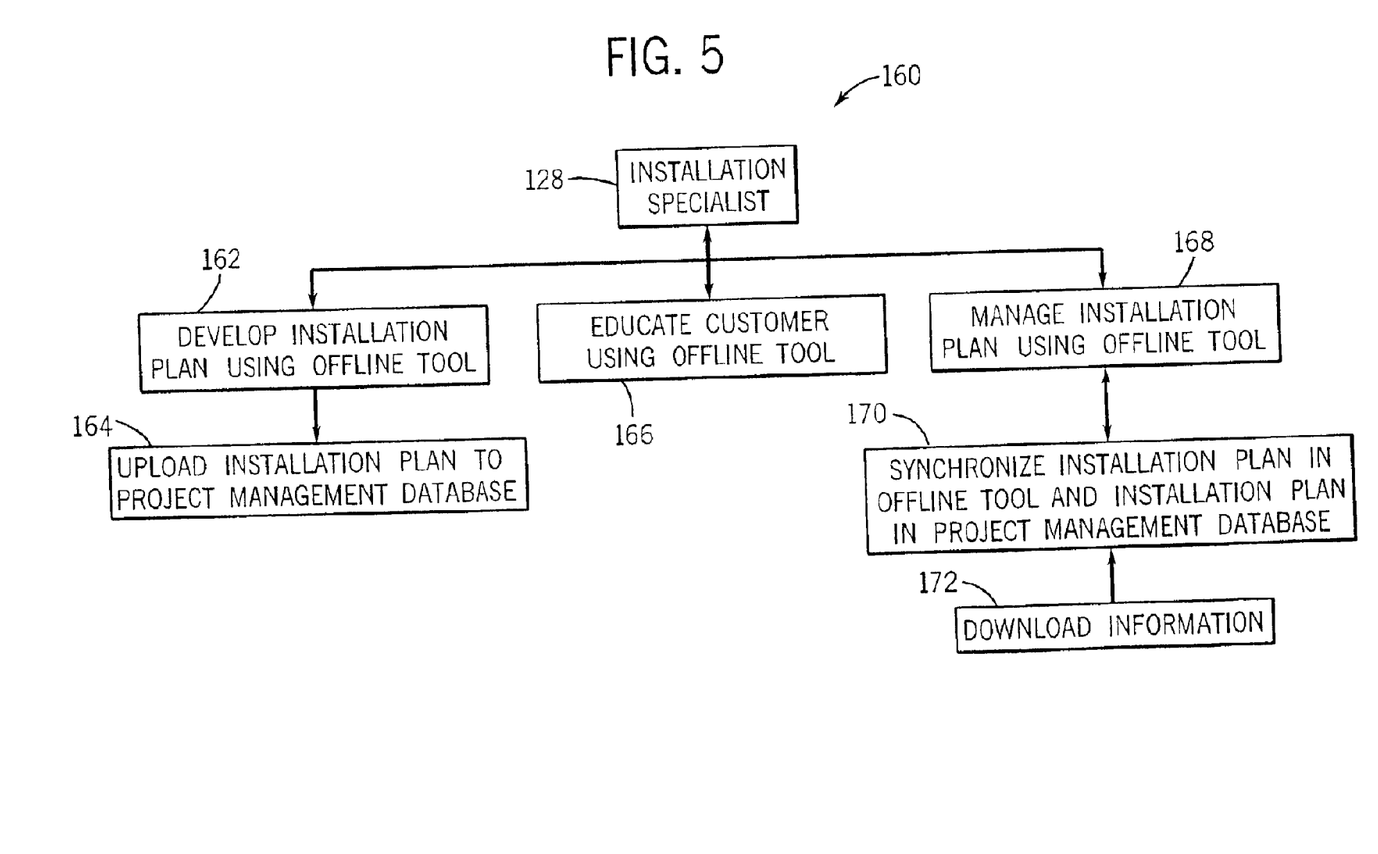
FIG. 5 is a block diagram of an exemplary embodiment of a process to enable an installation specialist to use an information system to develop and manage a preparation plan for installing a medical system.

Referring generally to FIG. 5, a process 160 whereby an installation specialist 128 may use system 122 to develop and manage a plan for installing a medical system is illustrated. In the illustrated process, an installation specialist may develop an installation plan for a medical system using an offline tool provided on supplier remote unit 24, as referenced by step 162. Once the installation specialist has developed the installation plan, the plan may be uploaded to the project management database, as referenced by step 164. Alternatively, an installation specialist may use the offline tool to educate the customer about installation preparation, as referenced by step 166. The installation specialist may also use the offline tool to manage the installation of the medical system by using an offline tool, as referenced by step 168. Changes to the installation plan developed using the offline tool are synchronized with the installation plan stored in the project management database, as referenced by step 170. Alternatively, information may be downloaded from the project management database to the offline tool, as referenced by step 172.

Figure 6:
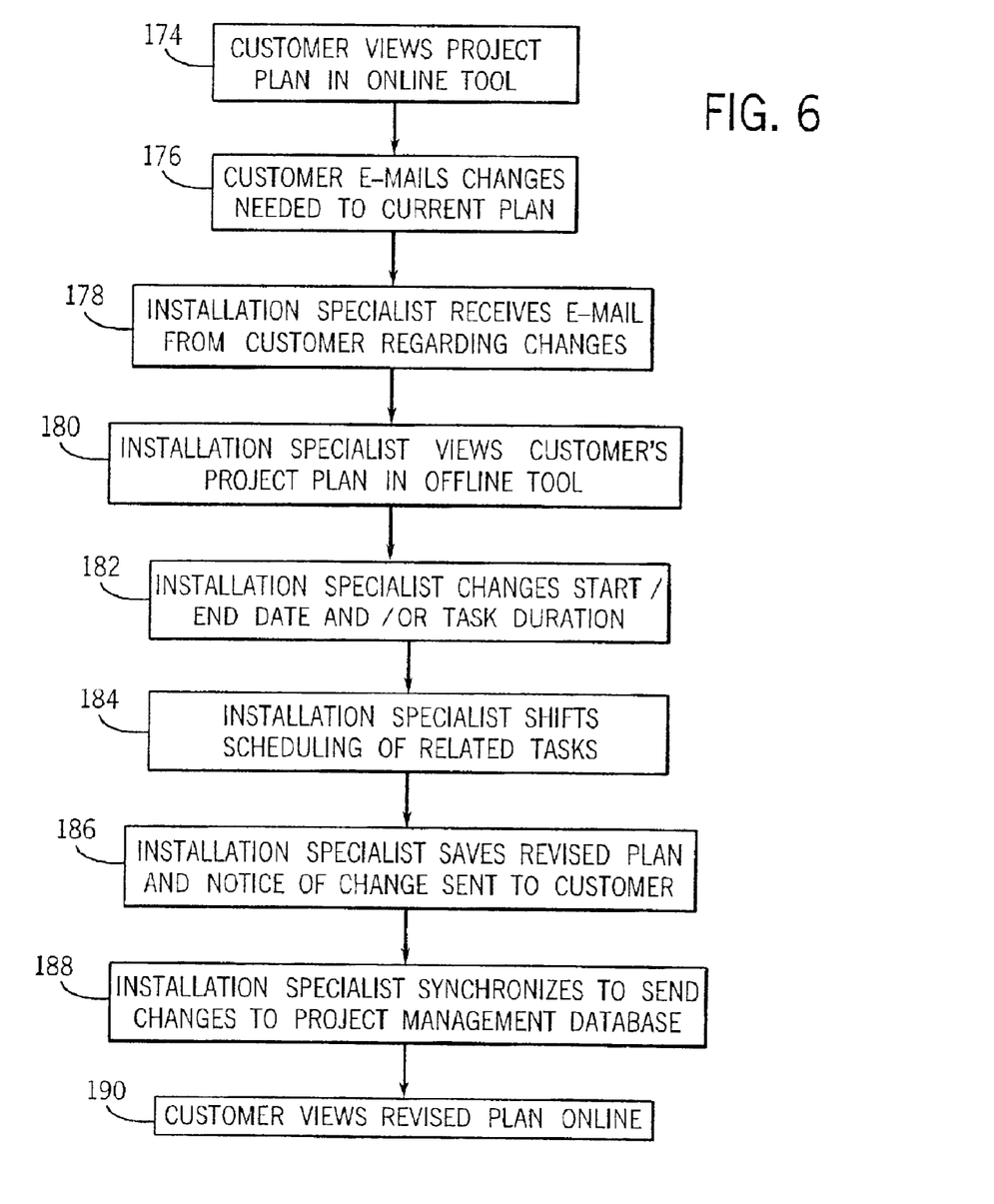
FIG. 6 is a block diagram of an illustrative process of using the information system to revise a preparation plan for installing a medical system.

Referring generally to FIG. 6, an example is provided of how a customer and an installation specialist may use system 122 to cooperatively manage the installation of a medical system. In the illustrated example, a customer may use network 80 to go online with information system 20 to view the installation plan, as referenced by step 174. Upon viewing the installation plan, the customer may contact an installation specialist, by E-mail for example, with changes to update the current installation plan, as referenced by step 176. The installation specialist receives the information from the customer regarding changes to the installation project plan, as referenced by step 178. The installation specialist utilizes the offline tool to view the customer's installation plan, as referenced by step 180. The installation specialist uses the offline tool to modify the customer's installation planning tool to reflect the customer's changes, as referenced in step 182. For example, the installation specialist may change starting or ending dates, task durations, etc. Additionally, installation specialists may shift the scheduling of related tasks, as referenced by step 184.

The installation specialists saves the revised installation plan and may send a notice of change via E-mail to the customer, as referenced by step 186. The installation specialist then synchronizes the revised installation plan stored in the offline installation planning tool with the installation plan stored in the project management database, as referenced by step 188. The customer may then view the revised installation project plan online on information system 20 via network 80, as referenced by step 190.

Figure 7:
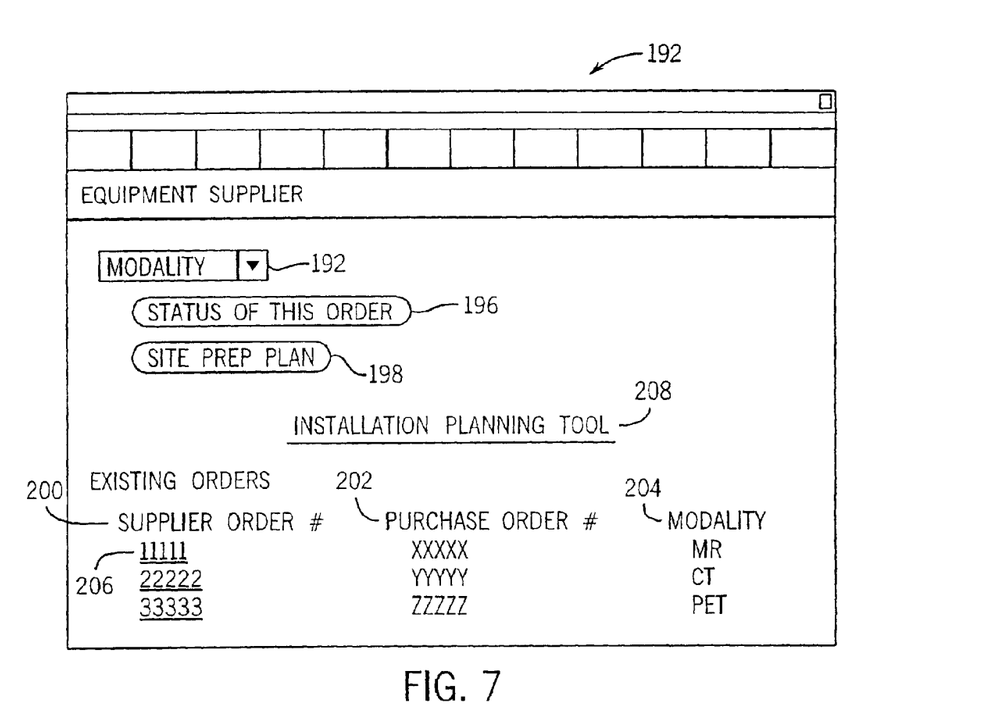
FIG. 7 is an exemplary embodiment of an information system page accessible via a network.

Referring generally to FIG. 7, an exemplary page 192 provided by information system 20 to a customer is illustrated. The illustrated page 192 provides a customer with online tools to manage the installation of medical imaging systems. In this embodiment, a pull-down menu 194 is provided to enable the customer to view information specific to the modality of the medical imaging system. Additionally, page 192 has a virtual button 196 that may be activated to give the status of a customer's order. Page 192 also has a virtual button 198 that may be activated to provide a customer with the installation plan for the customer. Information regarding existing orders may also be provided. The existing order information may include: the supplier order number 200, the customer's purchase order number 202, and the modality 204 of the diagnostic medical system corresponding to that order. Additionally, each supplier order number may have a HyperText link 206 to a second page that provides additional order information. In this embodiment, page 192 also has a link to an installation planning tool 208.

Figure 8:
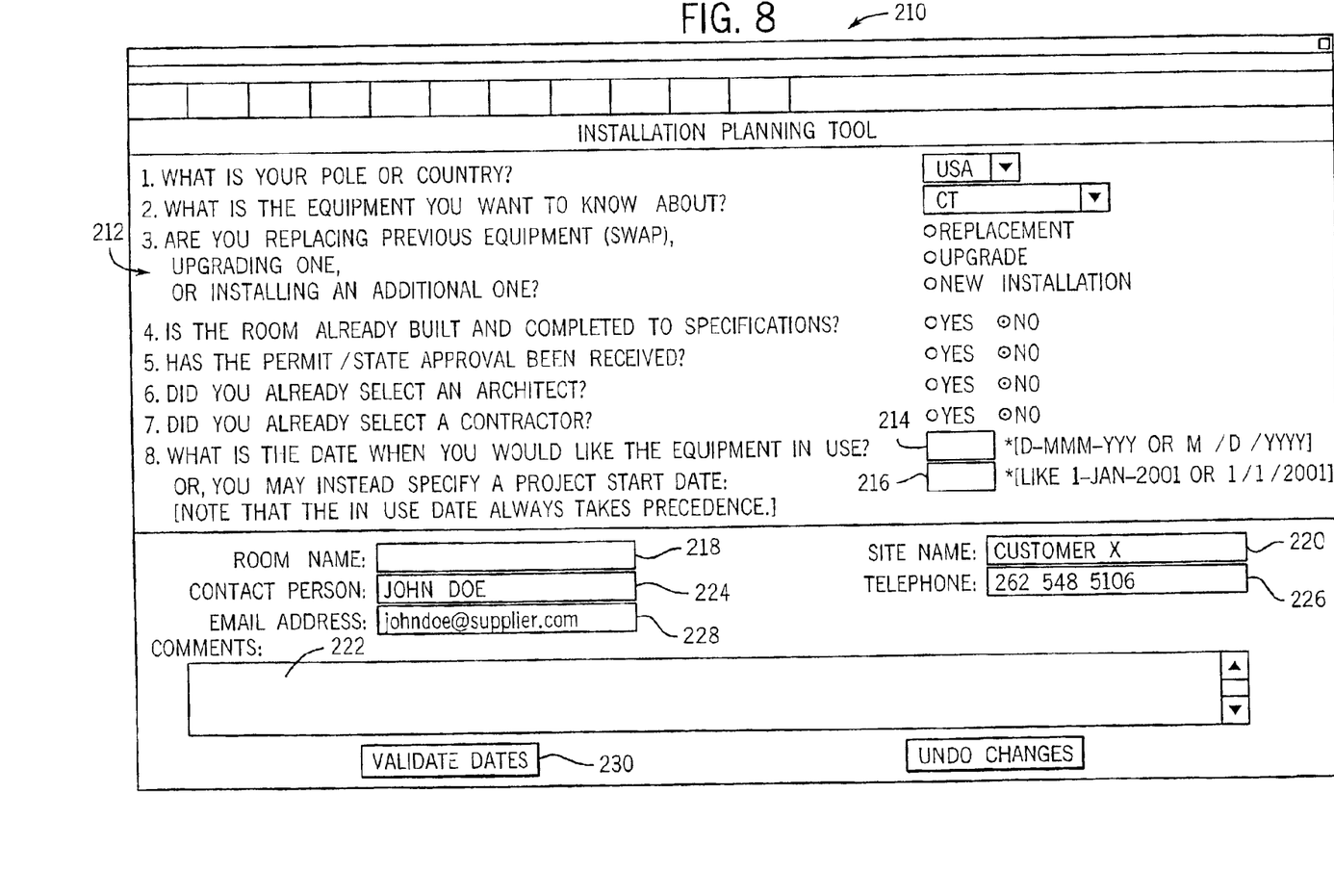
FIG. 8 is an exemplary embodiment of an information system query page provided to a customer by the information system via a network.

Referring generally to FIG. 8, an exemplary installation planning tool page 210 is illustrated. The installation planning tool 210 is operable to develop an installation plan for the medical imaging system, or systems, desired by the customer. In the illustrated embodiment, a series of questions 212 are provided to elicit specific information from the customer to enable the planning tool to develop an installation plan according to the customer's specific conditions. In this embodiment, a customer may enter in a first block 214 the desired date when the customer would like the equipment in use to examine patients. The customer may also enter the date when the customer would like the project to start in a second block 216.

The installation planning tool 210 also may be used to obtain other information from the customer. For example, an entry block 218 is provided to enable the customer to provide the room name of the room at the medical facility that is to receive the medical imaging system. Additionally, the name of the site, i.e., medical facility, to receive the medical imaging system may be entered into entry block 220. A comment block 222 is provided to enable the customer to provide additional information to the equipment supplier. The installation planning tool may also be used to provide information to the customer. For example, installation planning tool 210 has a block 224 to provide the customer with the supplier's designated contact person. Additionally, the telephone number of the contact person is provided in a second block 226 and the E-mail address of the contact is provided in a third block 228. Installation planning tool 210 also has a virtual button 230 that may be activated to validate the date provided by the customer and a virtual button 232 to undo changes entered by the customer.

Figure 9:
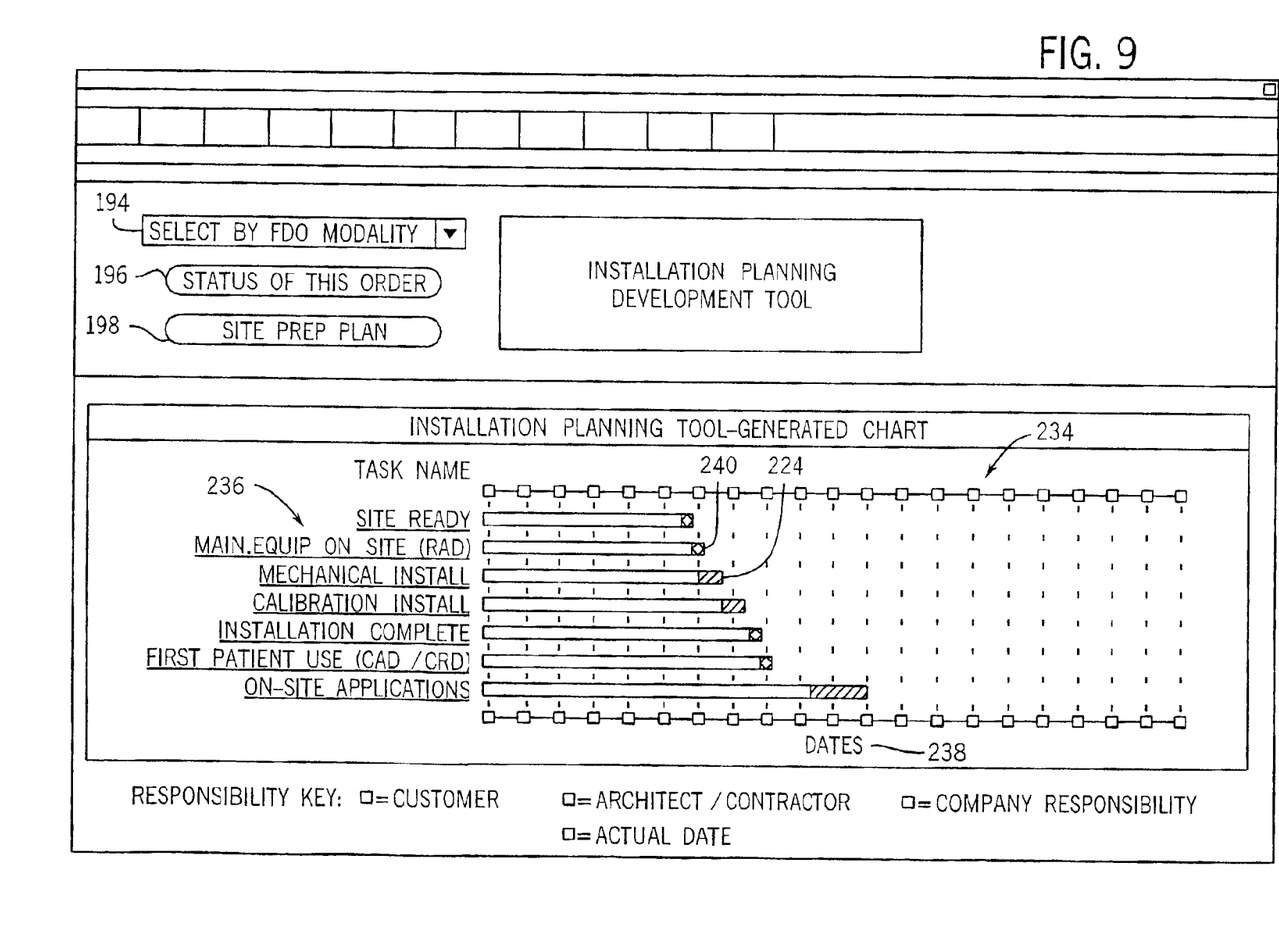
FIG. 9 is an exemplary embodiment of an initial installation plan presented in Gantt chart format on a page provided to a customer from the information system via a network.

Referring generally to FIG. 9, when the customer activates virtual button 230, the installation planning tool provides a Gantt chart 234 that represents a timetable of tasks to install the medical imaging system. The timetable is based on the date provided by the customer in the installation planning tool page 210, either the date may either be the equipment in use date or the project start date. In the illustrated embodiment, the chart provides a vertical list 236 of tasks and a horizontal list 238 of dates. Milestone dates and tasks expected to take a single day for performance are represented on the chart as diamonds 240. Horizontal bars 242 represent tasks expected to take more than one day. Diamonds 240 and bars 242 may be configured to indicate the party responsible for completion of the listed task, such as the customer, an architect, a contractor, or the equipment supplier.

Figure 10:
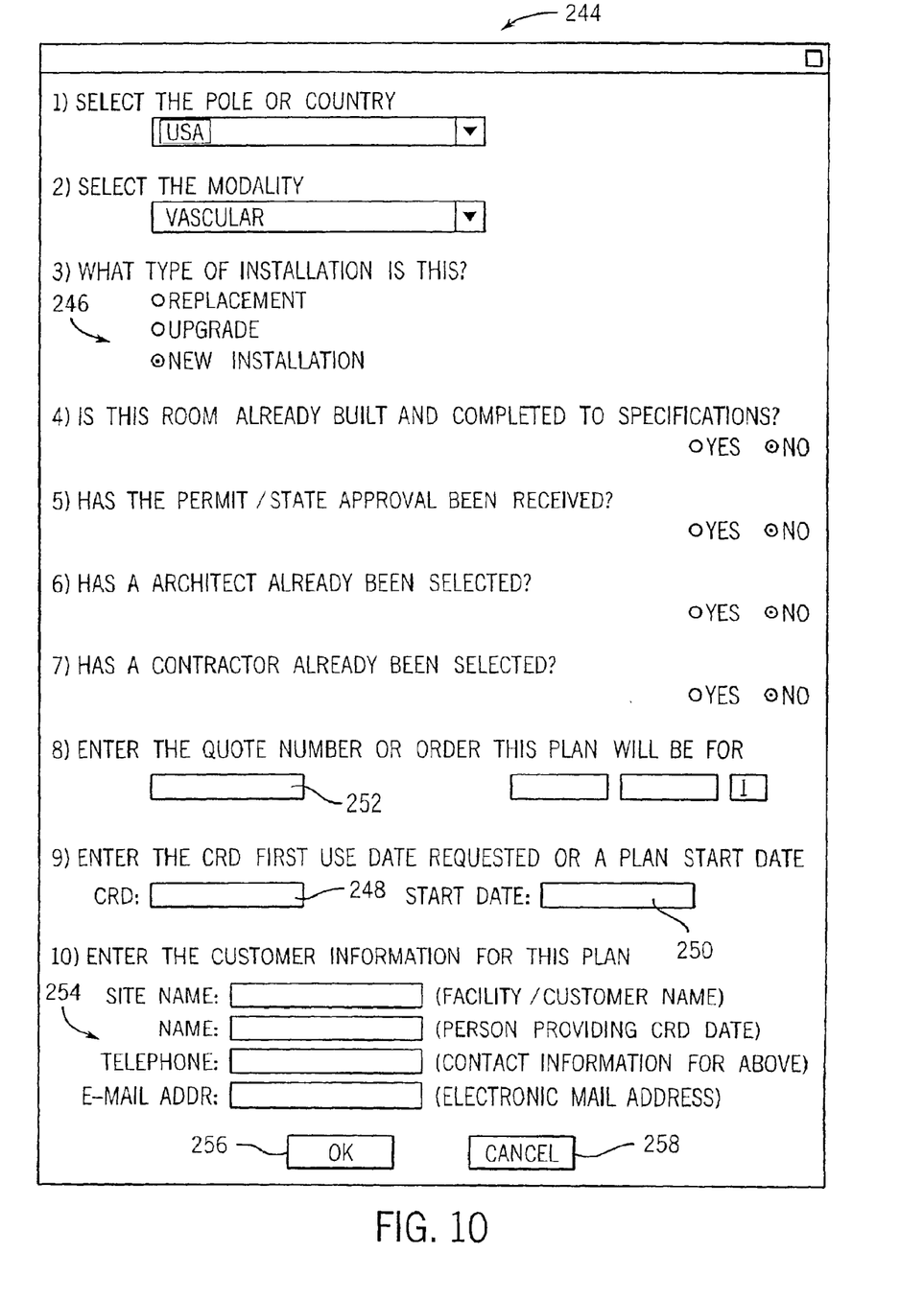
FIG. 10 is an exemplary embodiment of an information system query page available on an offline unit.

The installation plan may also be developed by an installation specialist using an offline tool. Referring generally to FIG. 10, an exemplary page 244 of an offline tool for developing an installation plan is illustrated. In the illustrated embodiment, offline tool 244 also has a series of questions 246. Questions 246 may be the same, or similar, to the questions provided to the customer via the online installation planning tool. For example, the first use date is provided in an entry block 248 or the plan start date is entered in a start date entry block 250. The supplier's quote number may be entered into entry block 252. Additional customer information may be provided in other entry blocks 254.

Figure 11:
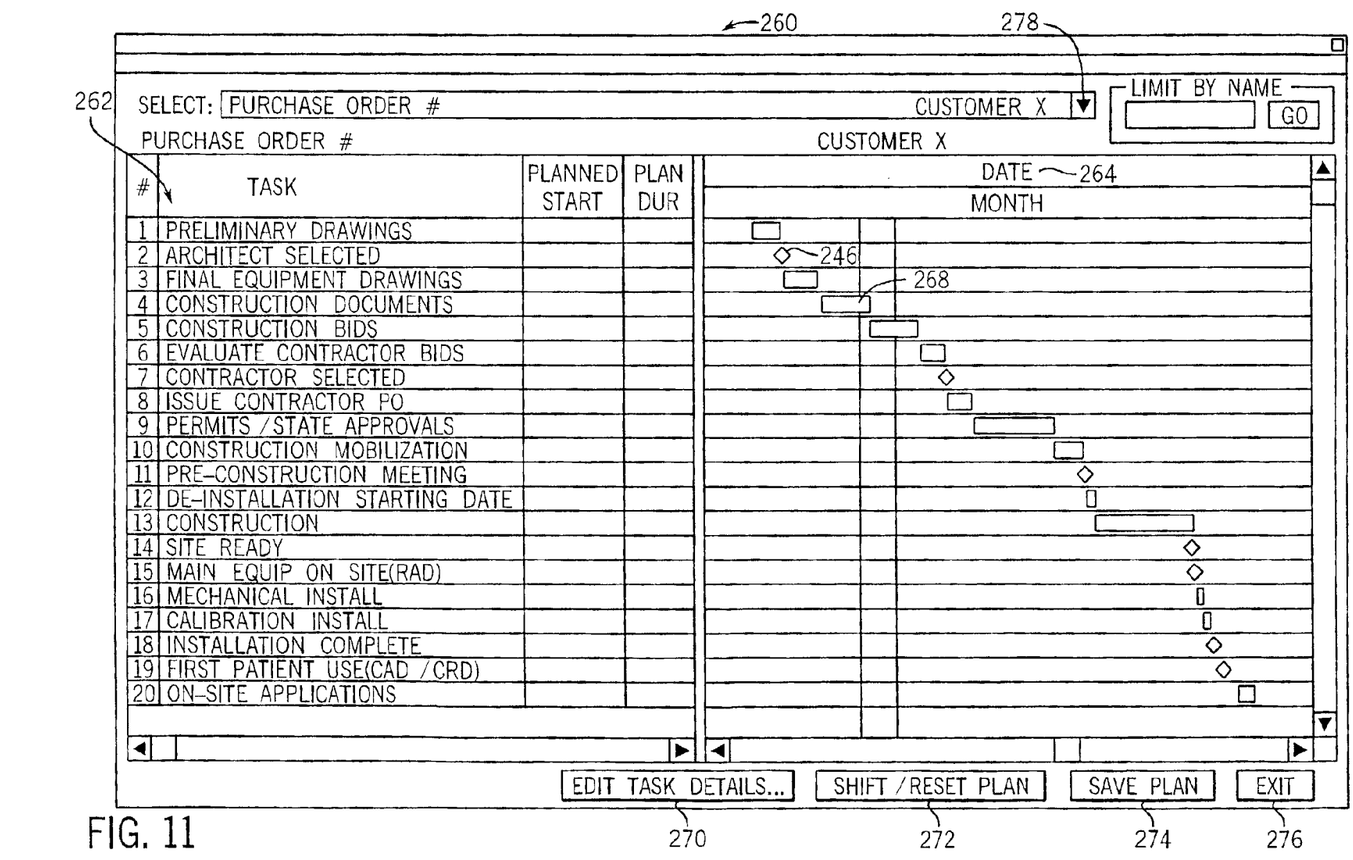
FIG. 11 is an exemplary embodiment of an initial installation plan presented in Gantt chart format on an offline unit.

Page 244 also includes a virtual button 256 that may be activated when the information has been entered. Additionally, a virtual button 258 may be provided to cancel the installation planning operation. When the virtual button 256 has been activated the offline installation planning tool provides the installation specialists with a Gantt chart 260 illustrating the timetable for performance of tasks for installing a medical imaging system. In this embodiment, a vertical list of tasks 262 to be completed to install the medical diagnostic system is provided along with horizontal list 264 of dates. Diamonds 266 represents milestone dates, and tasks expected to be completed in a single day. Bars 268 indicate tasks expected to take more than one day to complete. Diamonds 266 and bars 268 may be configured to indicate the party responsible for completion of the listed task, such as the customer, an architect, a contractor, or the equipment supplier.

Additionally, the installation specialist may change the date associated with the task based on ongoing events. For example, if a task is completed before or after the expected date for completion. Page 260 has a virtual button 270 that activates an editing tool to edit the task details. Additionally, page 260 has a virtual button 272 that may be activated to shift or reset the installation plan. Page 260 also has a virtual button 274 to save the installation plan and an exit button 276 that may be activated to exit the offline installation planning tool. Additionally, page 260 may have a pull-down menu 278 to enable the installation specialist to review the installation plan for a different purchase order.

Figure 12:
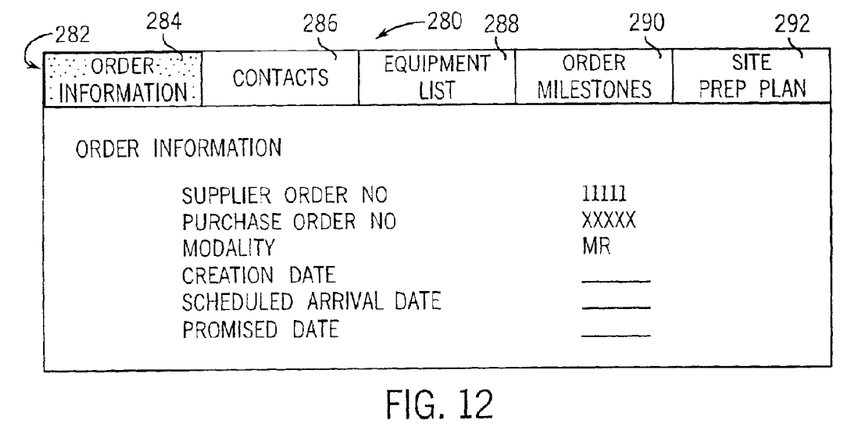
FIG. 12 is an exemplary embodiment of an information window illustrating equipment order information, the window being operable by activating a link from the information system page of FIG. 7
Figure 13:
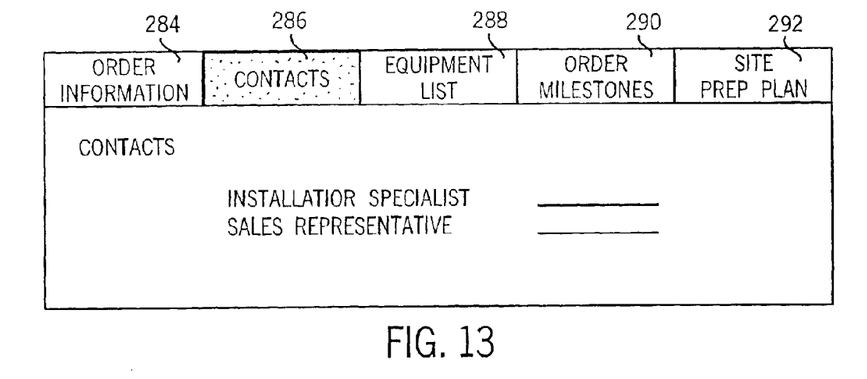
FIG. 13 is an exemplary embodiment of an information window illustrating contact persons, the window being operable by activating a virtual tab on the window of FIG. 12.
Figure 14:
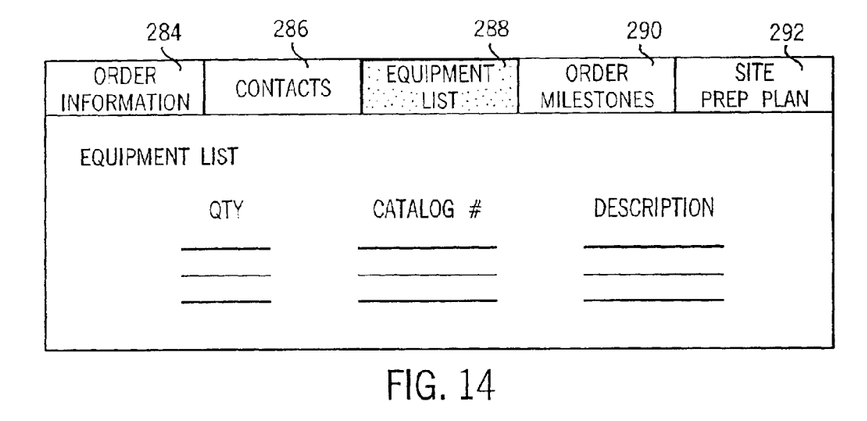
FIG. 14 is an exemplary embodiment of an information window illustrating an equipment list, the window being operable by activating a virtual tab on the window of FIG. 12.
Figure 15:
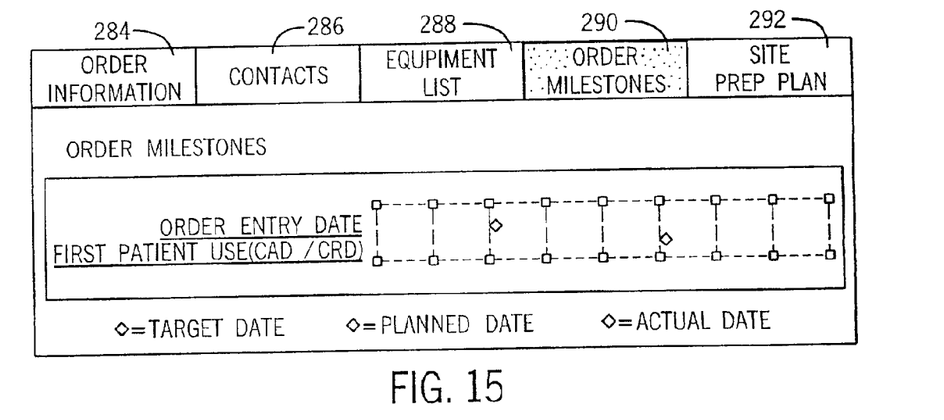
FIG. 15 is an exemplary embodiment of an information window illustrating order milestone dates, the window being operable by activating a virtual tab on the window of FIG. 12.
Figure 16:
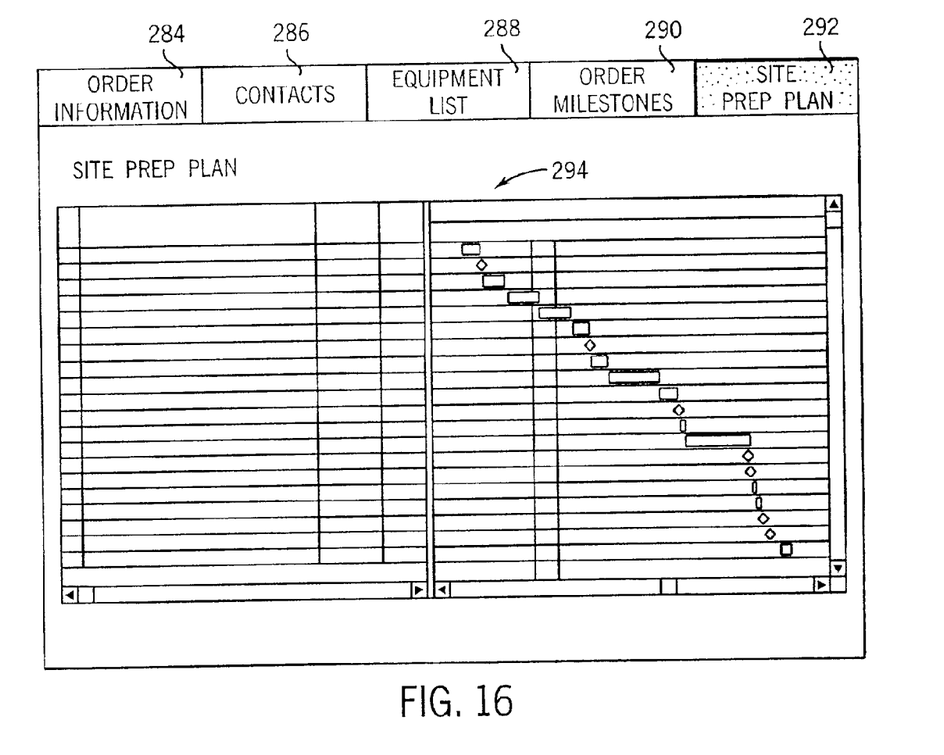
FIG. 16 is an exemplary embodiment of an information window illustrating a site preparation plan, the window being operable by activating a virtual tab on the window of FIG. 12.

Once an initial installation plan has been developed, the customer may review the status of the installation of the medical diagnostic system online. Referring again to FIG. 7, a customer may activate a link 206 to examine the status of an order. Referring generally to FIG. 12, when the link 206 is activated a browser window 280 is opened. In this embodiment, window 280 has five separate windows that may be viewed by activating tabs 282 along the top of window 280. In FIG. 12, the tab 284 corresponding to order information has been activated. Referring generally to FIG. 13, the tab 286 corresponding to contact information has been activated. Contact information, such as the name, phone number, and E-mail address, of supplier representatives, such as installation specialists and sales representatives may be provided. Referring generally to FIG. 14, the tab 288 corresponding to the equipment list has been activated. The equipment list may contain the entire list of equipment associated with the medical system. The status of each of the pieces of equipment may be provided as well. Referring generally to FIG. 15, the tab 290 corresponding to order milestones has been activated. The order milestones may be dates such as the expected first use of the medical system by a patient, the installation of a primary component, or any other significant date in the installation of the medical system. Referring generally to FIG. 16, the tab 292 corresponding to the site preparation plan has been activated. The site preparation plan 294 displays the current timetable for performance of the installation tasks. This version may reflect the originally develop installation plan and any changes or modifications made since the initial development of the installation plan.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An information system to enable a customer to install a device or system in a facility, comprising:
   a first application stored in memory and configured to provide a query page, the query page comprising a plurality of questions and answer choices, wherein at least one of the questions and answers elicits a desired date associated with the installation of the device;
   a database stored in memory, the database comprising a plurality of tasks to be completed to install the device or system and a model timetable for performing each of the plurality of tasks, the model timetable being based on a model installation; and
   a second application stored in memory, and configured to utilizes the model timetable to develop a specific timetable stored in memory for performing the plurality of tasks based on the desired date, wherein the information system enables the specific timetable to be modified if there are deviations from the model installation in the performance of the plurality of tasks.

2. The system as recited in claim 1, wherein the information system is coupleable to a network.

3. The system as recited in claim 2, wherein a customer may access the information system via the network.

4. The system as recited in claim 3, wherein the customer completes the query page by accessing the information system via the network.

5. The system as recited in claim 3, wherein the information system comprises a first unit and a second unit, wherein the first unit is coupleable to the second unit via the network.

6. The system as recited in claim 5, wherein the first unit is portable.

7. The system as recited in claim 6, wherein the first application, the database and the second application are stored in memory of the first unit and the second unit.

8. The system as recited in claim 7, wherein the query page is completed and an expected timetable developed by the first unit.

9. The system as recited in claim 8, wherein changes may be made to the specific timetable using the first unit and uploaded to the second unit via the network.

10. The system as recited in claim 1, wherein the system or device is a medical imaging system.

11. The system as recited in claim 10, wherein the desired date is the date that the customer desires to first use the medical imaging system to examine a patient.

12. The system as recited in claim 1, wherein a customer may use the information system to request a change to the specific timetable.

13. The system as recited in claim 1, wherein the model timetable is developed from a historic record of previous installations.

14. The system as recited in claim 13, wherein the information system is operable to update the historical record.

15. The system as recited in claim 1, wherein the expected timetable is provided in the form of a Gantt chart.

16. An information system to assist a customer develop and manage the installation of a device in a facility, comprising:
   a model installation plan stored in memory, the model installation plan comprising:
      a plurality of tasks to be completed to install a model device; and
      an expected timetable for performance of each of the plurality of tasks; and
   a data gathering portion, the data gathering portion being used to elicit installation information for installing a specific device;
   a tool stored in memory, the tool being operable to establish specific tasks and a specific timetable for the performance of the specific tasks based on the installation information, wherein the information system enables the specific timetable to be modified to accommodate deviations from the model installation plan.

17. The information system as recited in claim 16, wherein the device is a medical diagnostic system.

18. The information system as recited in claim 16, wherein the data gathering portion comprises a query page to establish the plurality of tasks to be performed.

19. The information system as recited in claim 16, wherein the data gathering portion comprises a query page to establish a desired date for completion of the installation.

20. The information system as recited in claim 19, wherein the tool establishes the specific timetable for the performance of the specific tasks so that the installation of the device is completed by the desired date.

21. The information system as recited in claim 16, wherein the system enables the specific timetable to be modified to reflect changes that occur during the installation of the specific system.

22. The information system as recited in claim 21, wherein the system is coupleable to a network.

23. The information system as recited in claim 22, wherein the system is operable to enable a customer to access the system via the network to view the specific timetable.

24. The information system as recited in claim 22, wherein the system is operable to enable a customer to access the system via the network to manage the expected timetable.

25. The information system as recited in claim 16, wherein the system comprises a portable unit and a second unit, wherein the portable unit is coupleable to the second unit via a network and the second unit is accessible to a customer via the network.

26. The information system as recited in claim 24, wherein the model installation plan, data gathering portion and tool are stored in memory in the portable unit and the specific tasks and specific timetable are developed by the tool in the portable unit and uploaded to the second unit via the network, further wherein the specific tasks and specific timetable are accessible to a customer by accessing the second unit via the network.

27. The information system as recited in claim 16, wherein the expected timetable is displayed as a Gantt chart.

28. A method of managing the installation of a medical system, the method comprising the acts of:
   developing a model list of tasks stored in memory to be performed to install a model medical system;
   eliciting installation information from a customer;
   establishing a plan of tasks stored in memory to be performed to install a specific medical system based on the model list of tasks to be performed for the model medical system and on the installation information elicited from the customer;
   providing the plan of tasks to be performed for viewing by a customer via a network; and
   enabling the plan of tasks to be modified to accommodate deviations from the model list of tasks to reflect actual installation conditions.

29. The method as recited in claim 28, wherein the plan of tasks comprises a timetable for performance of each of the tasks in the plan of tasks.

30. The method as recited in claim 28, wherein developing comprises forming a model of time expected for completion of each of the tasks in the model list of tasks.

31. The method as recited in claim 30, wherein the model is formed from a historical record of time for completion of each task.

32. The method as recited in claim 28, wherein eliciting comprises providing the customer with a query page via the network for completion by the customer.

33. The method as recited in claim 32, wherein the query page elicits information from the customer to identify tasks that have been performed.

34. The method as recited in claim 33, wherein establishing comprises comparing the model list of tasks to be performed with the tasks that have been performed.

35. The method as recited in claim 28, wherein providing comprises placing a chart detailing the plan of tasks to be performed on a network for viewing by a customer.

* * * * *